United States Patent [19]

Machida et al.

[11] 4,375,739

[45] Mar. 8, 1983

[54] METHOD FOR MANUFACTURING HYPERBOLIC SURFACE

[75] Inventors: Haruhiko Machida, Tokyo; Hiroshi Kobayashi, Kodaira, both of Japan

[73] Assignee: Machida Endoscope Company Limited, Tokyo, Japan

[21] Appl. No.: 228,859

[22] Filed: Jan. 27, 1981

[51] Int. Cl.³ .................... B24B 1/00; B24B 13/00
[52] U.S. Cl. .................... 51/58; 51/284 R; 82/12; 82/18; 264/2.5; 264/2.7
[58] Field of Search ............ 51/33 W, 58, 284 R; 82/12, 18, 11; 264/2.5, 2.7

[56] References Cited

U.S. PATENT DOCUMENTS

| | | | |
|---|---|---|---|
| 1,803,429 | 5/1931 | Ganning | 51/58 |
| 2,333,985 | 11/1943 | Clark | 82/18 |
| 2,568,040 | 9/1951 | Touray | 51/58 |
| 3,079,732 | 3/1963 | Rawstron | 51/58 |
| 3,142,140 | 7/1964 | Ishida | 51/284 |
| 3,739,822 | 6/1973 | Loof | 82/12 |
| 3,842,713 | 10/1974 | Hamilton | 51/284 |

FOREIGN PATENT DOCUMENTS 588063  1/1978  U.S.S.R. .................... 82/12

*Primary Examiner*—Harold D. Whitehead
*Attorney, Agent, or Firm*—Lawrence I. Field

[57] ABSTRACT

An optical lens having a hyperboloid surface is formed by cutting or grinding a workpiece made of glass or plastics while rotating it about its axis, while a cutting or grinding tool having a linear working edge is rotated or swung about a central axis, the working edge is separated from the center axis by a given distance and is inclined with respect to the central axis by a given angle. The envelope of the working edge forms a hyperboloid of one sheet of revolution along which the workpiece is cut or ground. An eccentricity of the hyperboloid curve can be adjusted by changing the inclined angle of the working edge with respect to the central axis.

10 Claims, 13 Drawing Figures

METHOD FOR MANUFACTURING HYPERBOLIC SURFACE

BACKGROUND OF THE INVENTION

The present invention relates to a method for manufacturing hyperbolic and hyperboloid surfaces.

Aspherical surfaces including hyperbolic and hyperboloid surfaces are very usefull for optical systems. For instance, aspherical lenses and aspherical reflecting mirrors are quite often used in order to correct an aperture aberration. However, in practice it is extremely difficult to manufacture the aspherical surfaces. It is a well known fact that it took several years to grind an aspherical reflecting mirror of a large diameter for use in an astronomical observatory. In this manner at the present it is technically as well as economically difficult to utilize the aspherical optical systems to the full extent and thus, in the optical systems such as camera lens systems various aberrations are corrected by combining a plurality of lenses. This results in that the lens systems are liable to be complicated in construction, heavy in weight and large in size.

Heretofore known methods for manufacturing the aspherical surfaces may be roughly classified into the following three methods;

(a) copy-grinding on the basis of a master curve
(b) Press-molding of synthetic resin or glass material
(c) cutting under numerical control with using NC machine tools.

In the methods (a) and (b) use is made of a master which has to be manufactured by skilled workers almost in a manual manner. Moreover an accuracy of the master can not be made sufficiently high. Further in the method (c) using the NC machine tools since a digital control is applied, a cut surface is inherently subjected to steps or stripes. This is particularly noticeable at a surface of large radius of curvature. In order to reduce such a drawback there has been developed an R interpolation method, but this solution could not assure the accuracy sufficiently. As described above accurate aspherical surfaces could not be manufactured by the known methods and there has not been proposed any method for easily manufacturing the aspherical surfaces having the theoretically high accuracy.

SUMMARY OF THE INVENTION

The present invention has for its object to provide a method for manufacturing easily and accurately aspherical surfaces, particularly hyperbolic and hyperboloid surfaces which have a theoretically determined configuration.

According to the invention a method for manufacturing a hyperbolic surface comprises securing a cutting and/or grinding tool having a linear working edge to a tool holding section in such a manner that the working edge is separated from a central axis by a given distance and is inclined with respect to the central axis by a given angle;

securing a workpiece to be processed to a workpiece holding section;

moving the cutting and/or grinding tool about said central axis;

moving the tool holding section and the workpiece holding section relative to each other; and grinding the workpiece by the working edge of the cutting and/or grinding tool into a hyperbolic surface along a hyperbolic locus formed by the working edge.

EXPLANATION OF THE PREFERRED EMBODIMENTS

Figure 1:
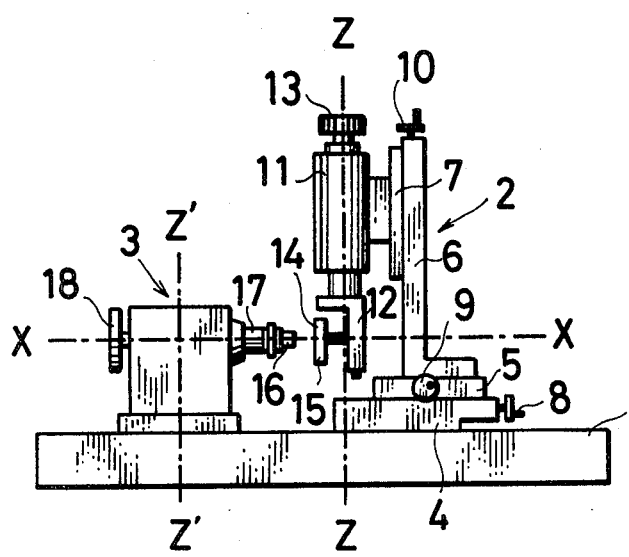
FIG. 1 is a schematic side view showing an apparatus for carrying out the hyperboloid surface manufacturing method according to the invention.
Figure 2A:
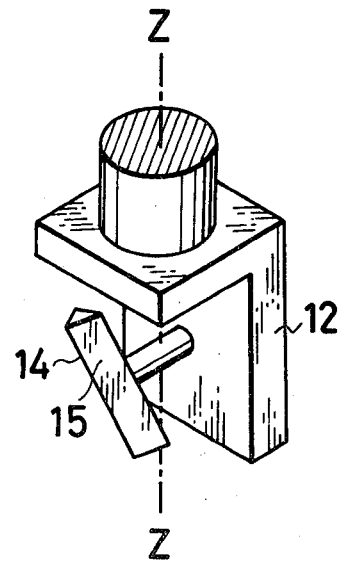
FIG. 2a is a perspective view illustrating a manner of securing a grinding tool.
Figure 2B:
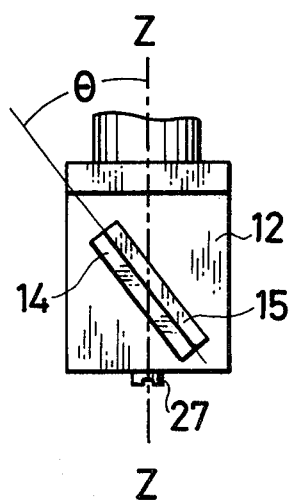
FIG. 2b is a front view depicting an inclined angle of the grinding tool with respect to a central axis and FIG. 2c is a schematic view showing the principle of the method according to the invention.
Figure 2C:
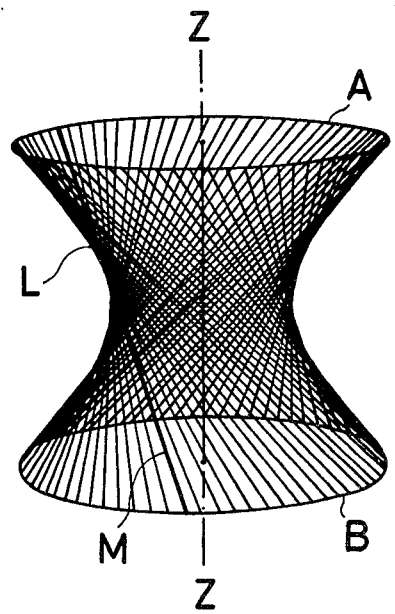

FIG. 1 shows an embodiment of an apparatus for carrying out the manufacturing method according to the invention. The apparatus comprises a base 1 on which are arranged a section 2 to which a tool is secured and a section 3 for holding a workpiece to be ground. The tool securing section 2 comprises an X-axis sliding plate 4 arranged slidably on the base 1 in a direction X which extends horizontally in the plane of FIG. 1 and a Y-axis sliding plate 5 arranged slidably on the X-axis sliding plate 4 in a direction Y which is perpendicular to the X-direction as well as to the plane of the drawing. Onto the Y-axis sliding plate 5 is secured an L-shaped base plate 6 to which a Z-axis sliding plate 7 is slidably secured in a direction Z which extends perpendicularly to the X direction in the plane of the drawing. The X, Y and Z-axis sliding plates 4,5 and 7 can be moved in the X, Y and Z directions by means of handles 8, 9 and 10, respectively. To the Z-axis sliding plate 7 there is secured a tool holding cylinder 11 having a central axis Z-Z which extends in the Z direction. At the lower end of the cylinder a tool securing die 12 is secured rotatably about the central axis Z-Z. The die 12 can be rotated by means of a tool rotating handle 13 provided at the upper end of the cylinder. To the die 12 is rigidly secured a grinding tool 15 having a linear working edge 14 by means of a fastening screw 27. According to the invention it is important to secure the grinding tool 15 to the die 12 in such a manner that the working edge 14 is inclined by a given angle with respect to the central axis Z-Z as illustrated in FIG. 2. Now it is considered a plane which passes through the central axis Z-Z and is in parallel with the linear working edge 14 of the tool 15 and an angle between the central axis Z-Z and a segment which is obtained by projecting the working edge 14 onto said plane is assumed to be $\theta$ which corresponds to said inclined angle.

It will be understood from the following explanation that the angle θ is a constant for determining an eccentricity of a hyperbolic surface to be manufactured and can be set to any desired value. When a work piece is made of relatively soft material such as synthetic resin, the grinding tool 15 may be formed of usual high speed steel, but when the workpiece is made of relatively hard material such as glass, the grinding tool 15 is preferably formed by a super hard tool including diamonds and tungsten carbides.

The workpiece securing section 3 comprises a chuck 17 for removably holding a workpiece 16 which can be rotated together with the chuck 17 about an X-axis X-X which is perpendicular to the central axis Z-Z and is in parallel with the X direction. The chuck 17 is rotated by a belt wheel 18 by means of a belt and an electric motor not shown here.

Figure 3A:
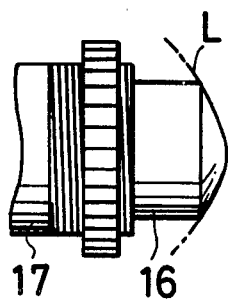
FIG. 3a is a side view showing a locus of a working edge of the grinding tool during the manufacture and FIG. 3b is a perspective view illustrating a ground lens having hyperboloid surfaces on both sides.
Figure 3B:
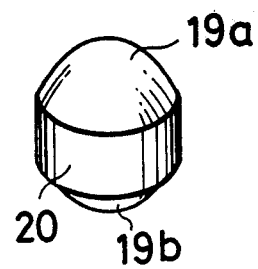

When the workpiece 16 of a short cylinder made of acrylate resin is ground into a lens having a surface of hyperboloid of revolution, the workpiece 16 is secured to the chuck 17. The Y-axis sliding plate 5 and Z-axis sliding plate 7 of the tool holding section 2 are adjusted by the handles 9 and 10 so as to center the grinding tool 15 with respect to the workpiece 16. The workpiece 16 is rotated by the electric motor. Then the grinding tool 15 is rotated by manually rotating the handle 13, while the grinding tool 15 is moved towards the rotating workpiece 16 by sliding the X-axis sliding plate 4 by means of the handle 8. In this manner the workpiece 16 is ground by the grinding tool 15. During this operation the working edge 14 of the grinding tool 15 forms a hyperbolic locus L as shown in FIG. 3a and thus the free end of the workpiece 16 is ground into the hyperboloid of revolution. Then the working edge 14 of grinding tool 15 draws the hyperbolic curve L which is formed on a plane passing through the Z-Z axis by an envelope of a number of segments M which are connected in an inclined fashion between two discs A and B separated in the direction of the Z-Z axis. Therefore, as shown in FIG. 3a the free end of the workpiece 16 is ground into a hyperboloid of revolution consisting the hyperbolic curves. In this manner when the both sides of the workpiece 16 are ground, it is possible to form a convex lens 20 having surfaces 19a and 19b of accurate hyperboloid of revolution as illustrated in FIG. 3b.

Figure 4A:
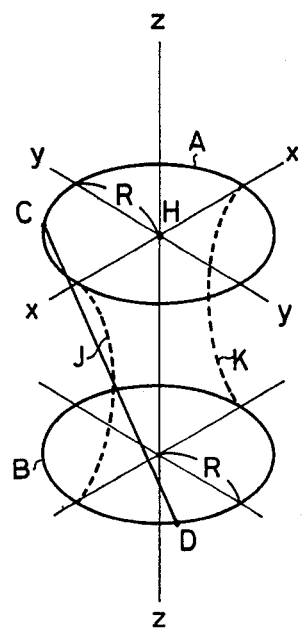
FIGS. 4a and 4b are diagrams for explaining theoretically the principle of the manufacturing method according to the invention.
Figure 4B:
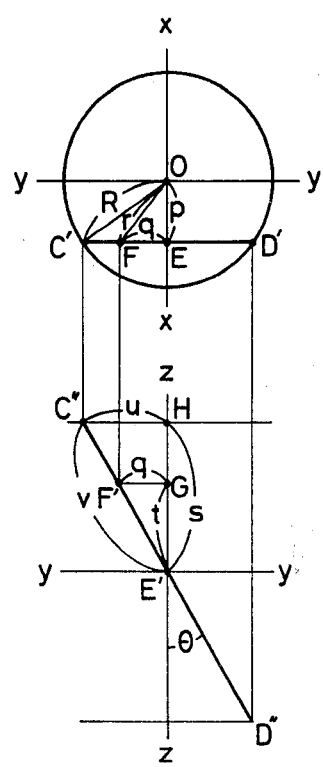

Now the principle of the invention will be mathematically analyzed with reference to FIG. 4. At first it is assumed in three-dimensional coordinates x, y, z as shown in FIG. 4a two circles A and B each having a radius of R and a center on the z-axis. These circles are in planes parallel to the x-y plane and are separated from each other along the z-axis. Then a segment $\overline{CD}$ is drawn between the circles A and B in such a manner that the segment $\overline{CD}$ is in parallel with the y-z plane. It should be noted that the z-axis corresponds to the central axis Z-Z in FIG. 1 and the segment $\overline{CD}$ corresponds to the working edge 14 of the grinding tool 15. When the segment $\overline{CD}$ is projected onto the x-y plane, a segment $\overline{C'D'}$ is obtained as illustrated in FIG. 4b and when the segment $\overline{CD}$ is projected onto the y-z plane, a segment $\overline{C''D''}$ is given as shown in FIGS. 4c. Now it is defined that a cross point between the segment $\overline{C'D'}$ and the x-axis is E, an arbitrary point on the segment $\overline{C'D'}$ is F, a distance $\overline{OE}$ from a center O of the x-y plane to the point E is p, a distance $\overline{OF}$ is r and a distance $\overline{EF}$ is q. Then the distance r is equal to a radius of a locus which is drawn by the point F on the segment $\overline{CD}$ when the segment $\overline{CD}$ is rotated about the z-axis.

As can been seen from FIG. 4b the following equation (1) can be derived.

$$\frac{\overline{EF}}{\overline{CE}} = \frac{q}{\sqrt{R^2 - P^2}} \quad (1)$$

Now it is further defined that points on the x-y plane obtained by projecting the points E and F are E' and F', respectively in FIG. 4c, a cross point between a line passing through the point F' in parallel with the y-axis and the z-axis is G, a center point of the circle A is H, $\overline{E'G} = t$ and $\overline{E'H} = s$. Then $$\frac{\overline{EF}}{\overline{CE}} = \frac{\overline{EG}}{\overline{EH}}$$

is obtained and the following equation (2) can be derived.

$$\frac{q}{\sqrt{R^2 - P^2}} = \frac{t}{s} \quad (2)$$

As can be understood from FIG. 4b the radius r can be expressed as $$r = \sqrt{P^2 + q^2} \quad (3)$$

Then the following equation (4) can be obtained from the above equations (2) and (3).

$$\frac{r^2}{p^2} - \frac{t^2}{\frac{s^2 p^2}{(R^2 - p^2)}} = 1 \quad (4)$$

In order to obtain a locus of a cross point between the segment $\overline{CD}$ and the x-z plane in case of rotating the segment $\overline{CD}$ about the z-axis, it is defined that r = x and t = z. Then the equation (4) can be rewritten in the following equation (5).

$$\frac{x^2}{p^2} - \frac{z^2}{\left(\frac{sp}{\sqrt{R^2 - p^2}}\right)^2} = 1 \quad (5)$$

A standard formula of a hyperbolic curve in an X-Z plane can be represented as follows.

$$\frac{X^2}{A^2} - \frac{Z^2}{B^2} = 1 \quad (6)$$

Upon comparing the above equations (5) and (6), it is clear that the equation (5) represents the hyperbolic curve which satisfies the following equation (7).

$$A = p, \; B = \frac{sp}{\sqrt{R^2 - p^2}} \quad (7)$$

Therefore by rotating the segment $\overline{CD}$ about the z-axis, the envelope of the segment $\overline{CD}$ forms a hyperboloid of one sheet shown by dotted lines J and K in FIG. 4a.

A ratio of a distance between foci of the hyperbolic curves to a distance between vertexes of hyperbolic curves, said ratio being generally called as an eccentricity e can be defined by the following equation (8).

$$e = \sqrt{1 + \frac{B^2}{A^2}} \qquad (8)$$

This equation (8) can be rewritten into the following equation (9) by introducing the equation (7).

$$e = \sqrt{1 + \frac{s^2}{R^2 - p^2}} \qquad (9)$$

Now from FIG. 4b, $R^2-p^2=\overline{(C'E)}^2$ is derived and from FIG. 4c, $R^2-p^2=(C'E)^2+(C''H)^2$ can be obtained. So if $\overline{C''H}=u$, the above equation (9) can be rewritten into the following equation (10).

$$e = \sqrt{\frac{(u^2 + s^2)}{u^2}} \qquad (10)$$

Further if $\overline{C''E'}=v$ is assumed, $e=v/u$ can be obtained and thus, the equation (10) can be finally expressed by the following equation (11).

$$e = \frac{1}{\sin\theta} \qquad (11)$$

It should be further noted that the length p represents a distance from the origin O to the vertex of the hyperbolic curve and is a constant for determining the property of the hyperbolic curve together with the eccentricity.

From the above analysis it can be easily understood that when the grinding tool 15 is rotated or swung about the central axis Z-Z, the working edge 14 of the tool 15 grinds the workpiece 16, while the working edge 14 forms the hyperbolic locus. In this case the eccentricity e of the hyperbolic curve is determined by the angle $\theta$ between the working edge 14 and the central axis Z-Z shown in FIG. 2. When the angle $\theta$ is made larger, the eccentricity becomes smaller and the hyperbolic surface has a convex surface having a larger curvature. Contrary to this when the angle $\theta$ is made smaller, there may be obtained a hyperbolic surface having a smaller curvature.

In an actual experiment the workpiece of acrylate resin was ground into a convex lens having hyperbolic surfaces following the given theoretical curves accurately. The ground surfaces are very smooth, but they may be subjected to separate polishing treatment.

Figure 5A:
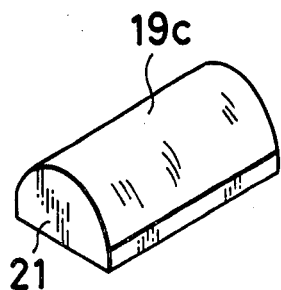
FIGS. 5a and 5b are perspective views showing semicylindrical lens and toric lens having hyperboloid surfaces formed by the present method.
Figure 5B:
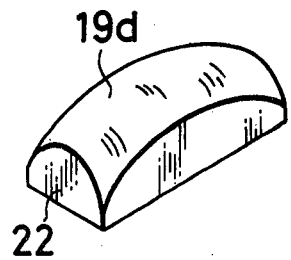

The apparatus shown in FIG. 1 is preferably used for manufacturing usual circular lenses, but may be also utilized for manufacturing semicylindrical lenses having hyperbolic curves only in one direction. In the latter case, the workpiece 16 is not rotated and the grinding tool 15 is rotated or swung, while the Y-axis sliding plate 5 is moved in the Y direction. In this manner a semicylindrical lens 21 having a hyperbolic surface 19c shown in FIG. 5a can be manufactured. Further when the workpiece holding section 3 is rotated about an axis Z'-Z' which passes through the X-X axis in parallel with the Z-Z axis, while the grinding tool 15 is rotated or swung about the central axis Z-Z, a toric body 22 with double foci having a hyperbolic surface 19d shown in FIG. 5b can be formed. It should be noted that the surface 19d is hyperbolic viewed in one direction and circular viewed in a direction perpendicular to said one direction.

As explained above in the method according to the invention the workpieces can be directly ground or cut into lenses and mirrors having convex hyperbolic or hyperboloid surfaces. When a body of grinding material is ground in accordance with the above method to form a grinding tool having a convex hyperboloid surface and then a concave hyperboloid surface can be manufactured with using said grinding tool as a secondary working tool.

Figure 6A:
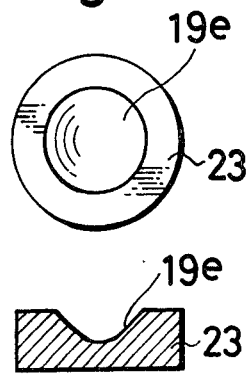
FIGS. 6a and 6b are plan views and cross sectional views illustrating master mold formed by pressing the hyperboloid surface manufactured by the present method.
Figure 6B:
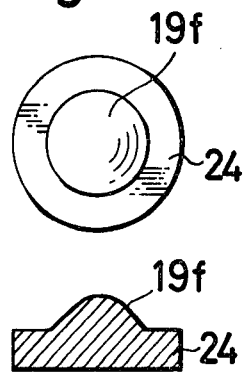

There may be other methods for manufacturing the hyperboloid surfaces in the above secondary manner. In one embodiment of such a method a master mold 23 of concave type shown in FIG. 6a is formed by pressing the convex hyperboloid surface manufactured by the apparatus shown in FIG. 1. When a copy-grinding is carried out with using a concave hyperboloid surface 19e of the master mold 23, a concave hyperboloid surface can be obtained and when master mold 23 is used to practice a press molding, a convex hyperboloid surface can be formed. Alternatively when the convex hyperboloid surface formed by the apparatus shown in FIG. 1 or another convex master mold 24 shown in FIG. 6b formed by pressing the master mold 23 is used in a copy-grinding and press-molding, a concave hyperboloid surface can be manufactured.

Figure 7:
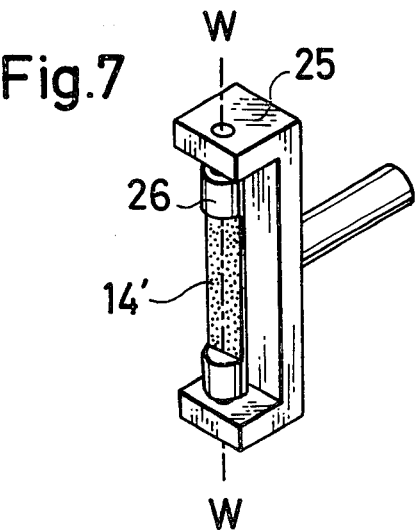
FIG. 7 is a perspective view depicting another embodiment of the grinding tool.

It should be noted that the present invention is not limited to the embodiments explained above, but may be modified in various ways within the scope of the invention. For instance, in the apparatus shown in FIG. 1 since the workpiece 16 is rotated, it is sufficient for the length of the working edge 14 of the grinding tool 15 to cover the radius of the workpiece 16. Further as the grinding tool 15 it is possible to use a rotating body 26 shown in FIG. 7 which has a planar grinding surface 14' and is rotatably journalled to a bracket 25. The grinding surface 14' has a center line W-W about which the grinding surface 14' is rotated. Also in this case the angle $\theta$ between the center line W-W and the central axis Z-Z determines the eccentricity. The grinding surface 14' may be made of abrasives. In the actual processing the grinding surface 14' is made in contact with the work piece 16 along the center line W-W, but in this case since the grinding surface 14' is rotated about the center line W-W, a more smooth hyperbolic surface may be obtained. In the embodiment illustrated in FIG. 1 the grinding tool 15 is manually rotated by means of the handle 13, but if the workpiece 16 is made of much harder material, the grinding tool 15 may be replaced by a cutting tool and may be preferably rotated or swung by means of an electric motor. Further it is preferable to feed the grinding and/or cutting tool 15 towards the workpiece 16 in an automatic manner.

As explained above in detail in the method according to the present invention by arranging the grinding and-/or cutting tool in the plane parallel to the central axis in an inclined fashion with respect to the central axis and swinging or rotating the grinding and/or cutting tool about the central axis, the workpiece can be formed in a hyperbolic surface which accurately follows the theoretical hyperbolic curve, because the envelope of the working edge of the grinding and/or cutting tool forms a hyperboloid of one sheet. The eccentricity of the hyperboloid surface can be easily adjusted by controlling the inclined angle θ. Further the master mold can be easily manufactured by the ground or cut workpiece and the hyperboloid surfaces can be formed with using the master mold. For example, by utilizing the optical lenses manufactured by the method according to the invention lens systems substantially free from aberration can be easily realized and thus, the lens systems become smaller in size and lighter in weight than the known lens systems constructed by a plurality of spherical lenses in order to correct the aberrations.

What is claimed is:

1. A method for manufacturing a hyperbolic surface on a workpiece comprising:
   securing a workpiece to be processed to a workpiece holding section;
   securing a shaping tool having a straight working edge to a tool holding section in such a manner that the working edge is separated from a central axis by a given distance and is inclined with respect to the central axis by a given angle;
   moving the tool about said central axis;
   moving the tool holding section and the workpiece holding section relative to each other; and
   shaping the workpiece by the working edge of the tool into a hyperbolic surface along a hyperbolic locus formed by the working edge.

2. A method according to claim 1, wherein the tool is rotated about said central axis.

3. A method according to claim 1, wherein the tool is swung about said central axis.

4. A method according to claim 1, wherein said inclined angle of the working edge with respect to the central axis is adjustable to control an eccentricity of the hyperbolic surface to be formed.

5. A method according to claim 1, wherein the workpiece is rotated about an axis which is perpendicular to said central axis to form a surface of a hyperboloid of revolution.

6. A method according to claim 1, wherein said workpiece and the tool are relatively moved in parallel with an axis which is perpendicular to the central axis to form a semicylindrical body having the hyperbolic surface.

7. A method according to claim 1, wherein the workpiece is swung about an axis which is in parallel with the central axis to form a toric body with a hyperbolic surface.

8. A method according to claim 1, wherein a master mold is formed by reproducing the convex hyperboloid surface so obtained and a concave hyperboloid surface is formed by copy-grinding using said master mold.

9. A method according to claim 1, wherein a master mold is formed by reproducing the convex hyperboloid surface so obtained and a concave hyperboloid surface is formed by press-molding using said master mold.

10. An apparatus for manufacturing a hyperbolic surface by shaping a workpiece comprising
   a base;
   an X-axis sliding member slidably mounted on the base in an X-direction;
   a Y-axis sliding member slidably mounted on the X-axis sliding member in a Y-direction perpendicular to the X-direction;
   a X-axis sliding member slidably mounted on the Y-axis sliding member in a Z-direction perpendicular to the X- and Y-directions;
   a working tool holding member extending in the Z-direction and rotatable about a central axis;
   a working tool secured to an end portion of the working tool holding member and having a straight working edge which is separated from the central axis by a given distance and is inclined with respect to the central axis by a given angle;
   means for holding a workpiece to be shaped;
   means for rotating the workpiece about an axis extending in the X-direction;
   means for rotating or swinging the working tool holding member about the central axis; and
   means for sliding the X-axis, Y-axis and Z-axis sliding members.

* * * * *